US012654420B2

(12) United States Patent
Umeda et al.

(10) Patent No.: US 12,654,420 B2
(45) Date of Patent: Jun. 16, 2026

(54) HEAT REFLECTIVE SUBSTRATE, MANUFACTURING METHOD THEREFOR, AND WINDOW GLASS

(71) Applicant: AGC Inc., Tokyo (JP)

(72) Inventors: Kenichi Umeda, Tokyo (JP); Keisuke Arai, Tokyo (JP); Masahiro Kishi, Tokyo (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 19/007,640

(22) Filed: Jan. 2, 2025

(65) Prior Publication Data

US 2025/0128984 A1 Apr. 24, 2025

Related U.S. Application Data

(63) Continuation of application No. PCT/JP2023/025362, filed on Jul. 7, 2023.

(30) Foreign Application Priority Data

Jul. 13, 2022 (JP) ................................. 2022-112708

(51) Int. Cl.
*B32B 3/10* (2006.01)
*B32B 7/027* (2019.01)
(Continued)

(52) U.S. Cl.
CPC ................ *B32B 3/10* (2013.01); *B32B 7/027* (2019.01); *B32B 15/00* (2013.01); *B32B 17/00* (2013.01)

(58) Field of Classification Search
CPC ........... B32B 3/10; B32B 7/027; B32B 15/00; B32B 17/00
(Continued)

(56) References Cited

U.S. PATENT DOCUMENTS

| | | | | |
|---|---|---|---|---|
| 2016/0290036 A1* | 10/2016 | Nukui | ...................... | B32B 27/20 |
| 2021/0191011 A1* | 6/2021 | Morita | .............. | B32B 17/10036 |
| 2025/0128984 A1* | 4/2025 | Umeda | .................. | B23K 26/50 |

FOREIGN PATENT DOCUMENTS

| | | |
|---|---|---|
| JP | 2010-68154 A | 3/2010 |
| JP | 2017-181911 | 10/2017 |

(Continued)

OTHER PUBLICATIONS

EP-Communication Pursuant to Rule 114(2) EPC, 23839589.1 on Jan. 27, 2026.

*Primary Examiner* — Betelhem Shewareged
(74) *Attorney, Agent, or Firm* — Oblon, McClelland, Maier & Neustadt, L.L.P.

(57) ABSTRACT

The present invention relates to a heat ray reflecting substrate including: a dielectric substrate; and a heat ray reflecting film formed on at least one main surface of the dielectric substrate, in which the heat-ray reflecting substrate has a radio wave transmitting region in at least a part of the at least one main surface of the dielectric substrate in a plan view, the radio wave transmitting region includes a slit portion where the heat ray reflecting film is not present, and in the radio wave transmitting region, a solar heat gain coefficient $(g_0)$ in a region including no slit portion and a solar heat gain coefficient $(g_1)$ in a region including the slit portion satisfy the following formula (a): $g_1<(1-f_2)\cdot g_0+f_2\alpha$ (a), provided that $f_2$ is a designed aperture rate, and $\alpha$ is a solar heat gain coefficient of the dielectric substrate.

10 Claims, 3 Drawing Sheets

(A)

(B)

(51) Int. Cl.
    *B32B 15/00*         (2006.01)
    *B32B 17/00*         (2006.01)

(58) Field of Classification Search
    USPC ....................................................... 428/195.1
    See application file for complete search history.

(56)                      References Cited

FOREIGN PATENT DOCUMENTS

| JP | 2020-121889 | 8/2020 |
| KR | 10-2020-0029646 | 3/2022 |
| WO | WO 2020/054762 A1 | 3/2020 |

\* cited by examiner (A)

(B)

HEAT REFLECTIVE SUBSTRATE, MANUFACTURING METHOD THEREFOR, AND WINDOW GLASS

CROSS-REFERENCE TO RELATED APPLICATIONS

This is a bypass continuation of International Application No. PCT/JP2023/025362 filed on Jul. 7, 2023, and claims priority from Japanese Patent Application No. 2022-112708 filed on Jul. 13, 2022, the entire content of which is incorporated herein by reference.

TECHNICAL FIELD

The present invention relates to a heat ray reflecting substrate, a manufacturing method therefore, and a window glass.

BACKGROUND ART

A heat ray reflecting glass obtained by forming a coating including a conductive layer made of a metal or other conductive materials on the glass surface reflects not only heat rays but also radio waves, and when used as a window glass in vehicles such as cars and trains, it impedes communication from inside the vehicle to the outside. In particular, there is a demand for the transmission of radio waves from mobile phones (800 MHz to 2 GHz) and keyless entry (Japan, USA: 315 MHz, Europe: 433.92 MHz).

Therefore, examples of a method for allowing radio waves to transmit for communication purposes include a method of cutting through a coated heat ray reflecting film to allow radio waves to transmit. However, there are many problems with this method, such as uneven coloring due to the cutting through. In addition, as a technique for transmitting radio waves, there is a frequency selective surface (FSS) in which two slits orthogonal to a heat ray reflecting film are provided.

Patent Literatures 1 and 2 describe a heat ray reflecting glass having such an FSS.

CITATION LIST

Patent Literature

Patent Literature 1: TP2010-068154A
Patent Literature 2: WO2020/054762

SUMMARY OF INVENTION

Technical Problem

However, in the heat ray reflecting glass described in Patent Literatures 1 and 2, slits for imparting radio wave transmissibility reduce an area covered by the heat ray reflecting film, which may decrease a heat shielding performance. Therefore, there is still room for improvement from the viewpoint of improving the heat shielding performance.

In view of the above problems, an object of the present invention is to provide a heat ray reflecting substrate imparted with excellent radio wave transmissibility and having a good heat ray reflection performance.

Solution to Problem

As a result of intensive studies, the inventors of the present invention have found that when a heat ray reflecting substrate is configured to cause optical scattering in a slit portion, the above problems can be solved. Thus, the present invention has been completed.

That is, the present invention has the following configuration.

[1]A heat ray reflecting substrate including:
a dielectric substrate; and
a heat ray reflecting film formed on at least one main surface of the dielectric substrate, in which
the heat-ray reflecting substrate has a radio wave transmitting region in at least a part of the at least one main surface of the dielectric substrate in a plan view,
the radio wave transmitting region includes a slit portion where the heat ray reflecting film is not present, and
in the radio wave transmitting region, a solar heat gain coefficient ($g_0$) in a region including no slit portion and a solar heat gain coefficient ($g_1$) in a region including the slit portion satisfy the following formula (a):

$$g_1 < (1 - f_2) \cdot g_0 + f_2 \alpha \qquad (a)$$

provided that $f_2$ is a designed aperture rate, and $\alpha$ is a solar heat gain coefficient of the dielectric substrate.

[2] The heat ray reflecting substrate according to [1], in which
in the radio wave transmitting region, a luminous transmittance ($Tv_0$) in a region including no slit portion and $\alpha$ luminous transmittance ($Tv_1$) in a region including the slit portion satisfy a relational expression of $Tv_1 < Tv_0$.

[3] The heat ray reflecting substrate according to [1] or [2], in which
the radio wave transmitting region transmits a radio wave having a target frequency with a transmission of −20 dB or more.

[4] The heat ray reflecting substrate according to [3], in which
the target frequency is 700 MHz to 100 GHz.

[5] The heat ray reflecting substrate according to any one of [1] to [4], in which
in the radio wave transmitting region, a relational expression of $\beta < 0.995$ is satisfied when $g_1 = \beta((1-f_2) \cdot g_0 + f_2 \alpha)$.

[6] The heat ray reflecting substrate according to any one of [1] to [5], in which
the solar heat gain coefficient ($g_0$) in the region including no slit portion is 0.7 or less.

[7] The heat ray reflecting substrate according to any one of [1] to [6], in which
in the radio wave transmitting region, [a haze in a region including the slit portion] is four times or more [a haze in a region including no slit portion].

[8] The heat ray reflecting substrate according to any one of [1] to [7], in which when the radio wave transmitting region includes the slit portion having a grid-like slit pattern, a slit width is 20 μm to 100 μm, and α slit interval is 0.2 mm to 14 mm.

[9]A window glass including the heat ray reflecting substrate according to any one of [1] to [8].

[10]A method for producing the heat ray reflecting substrate according to any one of [1] to [8], the method including:
forming the slit portion using a nanosecond laser.

Advantageous Effects of Invention

According to the present invention, it is possible to provide a heat ray reflecting substrate imparted with excellent radio wave transmissibility and having a good heat ray reflection performance, a method for producing the heat ray reflecting substrate, and a window glass including the heat ray reflecting substrate.

DESCRIPTION OF EMBODIMENTS

Figure 1:
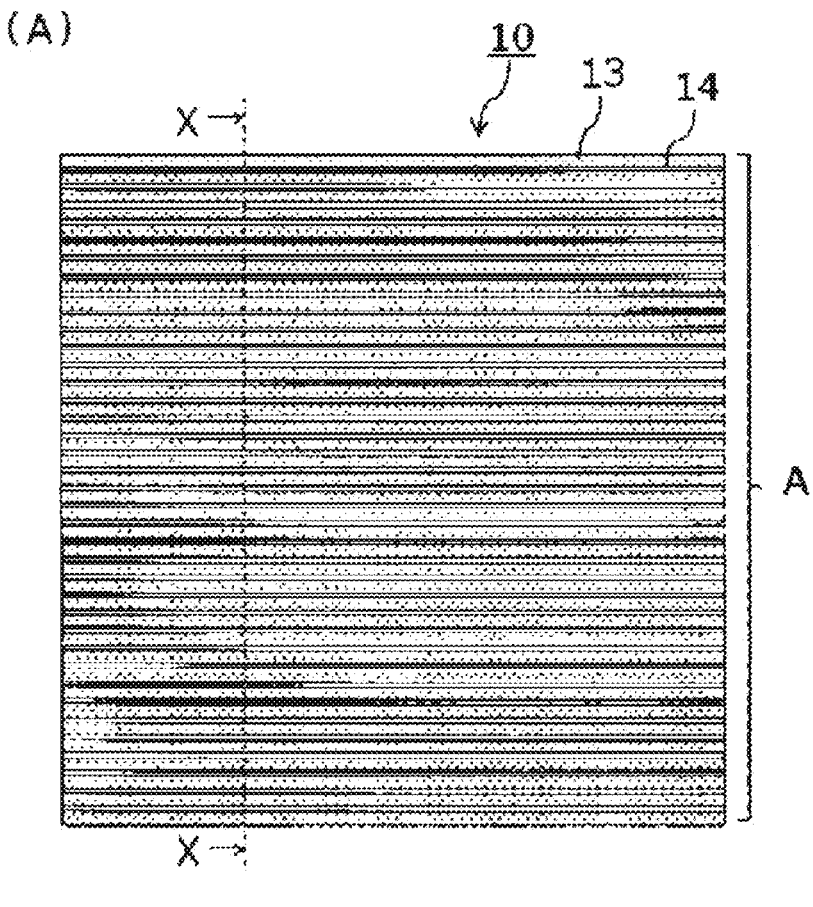
FIG. 1 shows diagrams showing a heat ray reflecting substrate according to one embodiment of the present invention. (A) in FIG. 1 is a top view of the heat ray reflecting substrate, and (B) in FIG. 1 is an enlarged view of a cross section taken along a line X-X in (A).
Figure 1:
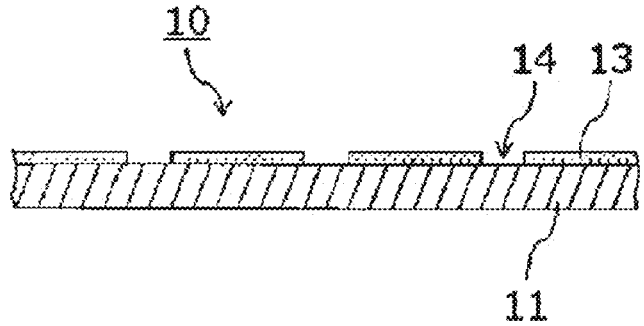

Hereinafter, the present invention will be described in detail, but the present invention is not limited to the following embodiment, and can be freely modified and implemented without departing from the gist of the present invention.

In addition, "to" indicating a numerical range is used to include numerical values written before and after it as a lower limit value and an upper limit value.

In the following drawings, members and portions having the same functions may be denoted by the same reference numerals, and duplicate descriptions may be omitted or simplified. The embodiment described in the drawings is schematic for the purpose of clearly illustrating the present invention, and does not necessarily accurately represent a size or a scale of an actual product.

Heat Ray Reflecting Substrate

A heat ray reflecting substrate according to the present embodiment includes: a dielectric substrate; and a heat ray reflecting film formed on at least one main surface of the dielectric substrate, in which the at least one main surface has a radio wave transmitting region in at least a part thereof in a plan view, the radio wave transmitting region includes a slit portion where no heat ray reflecting film is present, and in the radio wave transmitting region, a solar heat gain coefficient ($g_0$) in a region including no slit portion and a solar heat gain coefficient ($g_1$) in a region including a slit portion satisfy the following formula (a).

$$g_1 < (1 - f_2) \cdot g_0 + f_2 \alpha \qquad (a)$$

(Where $f_2$ is a designed aperture rate, and $\alpha$ is a solar heat gain coefficient of the dielectric substrate.)

FIG. 1 is a diagram showing a heat ray reflecting substrate according to one embodiment of the present invention. (A) in FIG. 1 is a top view of the heat ray reflecting substrate, and (B) in FIG. 1 is an enlarged view of a cross section taken along a line X-X in (A).

A heat ray reflecting substrate 10 in the present embodiment includes a dielectric substrate 11 and a heat ray reflecting film 13 formed on at least one main surface of the dielectric substrate 11, and the at least one main surface has a radio wave transmitting region A in at least a part thereof in a plan view.

<Dielectric Substrate>

The dielectric substrate in the present embodiment is not particularly limited as long as the substrate is made of a dielectric material, and may be, for example, a glass substrate made of a soda lime glass, an alkali-free glass, or a quartz glass. The glass substrate may be physically strengthened or chemically strengthened. The glass substrate may be made of a single piece of glass, or may be made by laminating a plurality of pieces of glass with a film made of resin (resin film) or the like sandwiched therebetween.

The dielectric substrate in the present embodiment is not limited to a glass substrate, and may be, for example, a substrate made of a resin (resin substrate) or a composite substrate in which a resin substrate and a glass substrate are laminated. Examples of the resin substrate include substrates made of acrylic resins such as polymethyl methacrylate, aromatic polycarbonate resins such as polyphenylene carbonate, and aromatic polyester resins such as polyethylene terephthalate (PET).

A shape of the dielectric substrate in the present embodiment is not particularly limited, and may be flat or curved. A thickness of the dielectric substrate in the present embodiment is also not particularly limited, and may be adjusted as appropriate according to desired strength, lightness, or the like.

Physical properties of the dielectric substrate in the present embodiment, such as radio wave transmissibility and heat ray reflectance, are not particularly limited as long as the effect of the present invention is exerted, and may be adjusted as appropriate according to physical properties required for the heat ray reflecting substrate to be finally obtained.

For example, the dielectric substrate in the present embodiment has a radio wave transmission loss of preferably 4 dB or less, more preferably 3 dB or less, and still more preferably 2 dB or less, for a radio wave at 28 GHz. The radio wave transmission loss can be measured by a free space method.

In addition, the dielectric substrate in the present embodiment has a solar heat gain coefficient of preferably 0.8 or less, more preferably 0.75 or less, and still more preferably 0.7 or less. The solar heat gain coefficient of the dielectric substrate is calculated by measuring the spectral spectrum and emissivity based on the standard in ISO 9050 (2003) and performing optical calculation.

In the case where a glass substrate is used as the dielectric substrate in the present embodiment, the glass substrate preferably has a specific gravity of 2.4 or more and 3.0 or less. In addition, the glass substrate preferably has a Young's modulus of 60 GPa or more and 100 GPa or less. In addition, the glass substrate preferably has an average thermal expansion coefficient at 50° C. to 350° C. of $50 \times 10^{-7}/°$ C. or more and $120 \times 10^{-7}/°$ C. or less. When the glass substrate satisfies these physical property requirements, the glass substrate can be used sufficiently and suitably as a window material.

<Heat Ray Reflecting Film>

The heat ray reflecting film in the present embodiment is not particularly limited as long as it can impart a function of reflecting heat rays to the heat ray reflecting substrate. A typical example of a film that can impart the function of reflecting heat rays is a conductive film.

The "conductive film" in the present description refers to a film having an electrical resistivity of $10^0$ [$\Omega \cdot$cm] or less at 20° C., for example. A component of the conductive film is not particularly limited, and for example, the conductive film preferably contains, as a main component, a metal such as silver, aluminum, indium tin oxide (ITO), tin oxide doped with at least one of fluorine or antimony ($SnO_2$:F, Sb), titanium nitride, niobium nitride, chromium nitride, zirconium nitride, and hafnium nitride (hereinafter, also referred to as a "conductive film component group A") that have excellent heat ray reflectance. Note that, in the present description, the main component means that the content of the component relative to all components is 50 atom % or more. That is, the conductive film in the present embodiment contains at least one selected from the group consisting of the conductive film component group A, and the content of the conductive film component group A in the conductive film in the present embodiment is preferably 50 atom % or more in total.

In order for the heat ray reflecting substrate to exert excellent heat ray reflectance, the conductive film preferably contains at least one of silver and aluminum as the main component, and the conductive film more preferably contains silver as the main component (that is, contains 50 atom % or more), and still more preferably contains 95 atom % or more of silver.

The conductive film containing silver as the main component may contain one or more additive elements such as gold, palladium, copper, bismuth, neodymium, and platinum. By containing such additive elements in the conductive film containing silver as the main component, diffusion of silver can be prevented and moisture resistance can be improved. Note that, the additive elements are not limited to those exemplified above, and any element can be added as long as the effect of the present invention is exerted.

The thickness of the heat ray reflecting film (conductive film) in the present embodiment is not particularly limited, and may be adjusted as appropriate according to the radio wave transmissibility at a predetermined frequency, the heat ray reflectance, visible light transmissibility, appearance, and the like required for the heat ray reflecting substrate to be finally obtained. The thickness of the heat ray reflecting film is usually 1 nm or more, preferably 3 nm or more, more preferably 5 nm or more, and still more preferably 6 nm or more. The thickness is preferably 100 nm or less, more preferably 50 nm or less, and still more preferably 20 nm or less. The thickness is preferably 1 nm to 100 nm, for example.

The heat ray reflecting film may be one layer (single layer) or a multi-layer such as two or three layers. In the case where the heat ray reflecting film has multiple layers, the layers may be adjacent to each other in the thickness direction of the heat ray reflecting film, or may be separated from each other by interposing another film (another layer) to be described later between the layers. Note that, in the case where the heat ray reflecting film includes has multiple layers, a total thickness may be within the above range.

The heat ray reflecting substrate in the present embodiment may be provided with a film (another film) different from the heat ray reflecting film as long as the effect of the present invention is exerted.

The heat ray reflecting substrate in the present embodiment may be provided with, for example, a metal oxide layer or a metal nitride layer as the film (another film) different from the heat ray reflecting film, and preferably includes at least one of a metal oxide layer and α metal nitride layer. In particular, it is preferable in terms of durability that the heat ray reflecting substrate has a layer configuration in which the heat ray reflecting film (conductive film) is sandwiched between the other layers such as a metal oxide layer or a metal nitride layer.

Examples of the metal oxide layer include layers containing, as a main component, metal oxides such as aluminum oxide, zinc oxide, indium oxide, titanium oxide, niobium oxide, tin oxide, bismuth oxide, tantalum oxide, tungsten oxide, zirconium oxide, and silicon oxide. Among these, the metal oxide layer preferably contains zinc oxide as the main component from the viewpoint of being compatible with silver which is a preferred component of the conductive film and improving the durability of the heat ray reflecting film (conductive film).

Examples of the metal nitride layer include layers containing, as a main component, metal nitrides such as silicon nitride ($Si_3N_4$) and aluminum nitride (AlN).

The method of forming the heat ray reflecting film is not particularly limited, and, for example, physical vapor deposition methods (a vacuum vapor deposition method, an ion plating method, a magnetron sputtering method, and the like), chemical vapor deposition methods (a thermal CVD method, a plasma CVD method, a photo CVD method, and the like), and an ion beam sputtering method can be used. In the case where a film forming area is large, a direct current magnetron sputtering method, a direct current pulse magnetron sputtering method, or an alternating current dual magnetron sputtering method is preferred because uniformity of the thickness is easily controlled and productivity is excellent.

The heat ray reflecting film in the present embodiment may be formed directly or indirectly on the dielectric substrate. The method of indirectly forming the heat ray reflecting film on the dielectric substrate is not particularly limited, and examples thereof include a method of attaching, to a dielectric substrate, a resin film on which a heat ray reflecting film is formed. In addition, in the present embodiment, a commercially available product having a heat ray reflecting film formed on a dielectric substrate may also be used.

Figure 2:
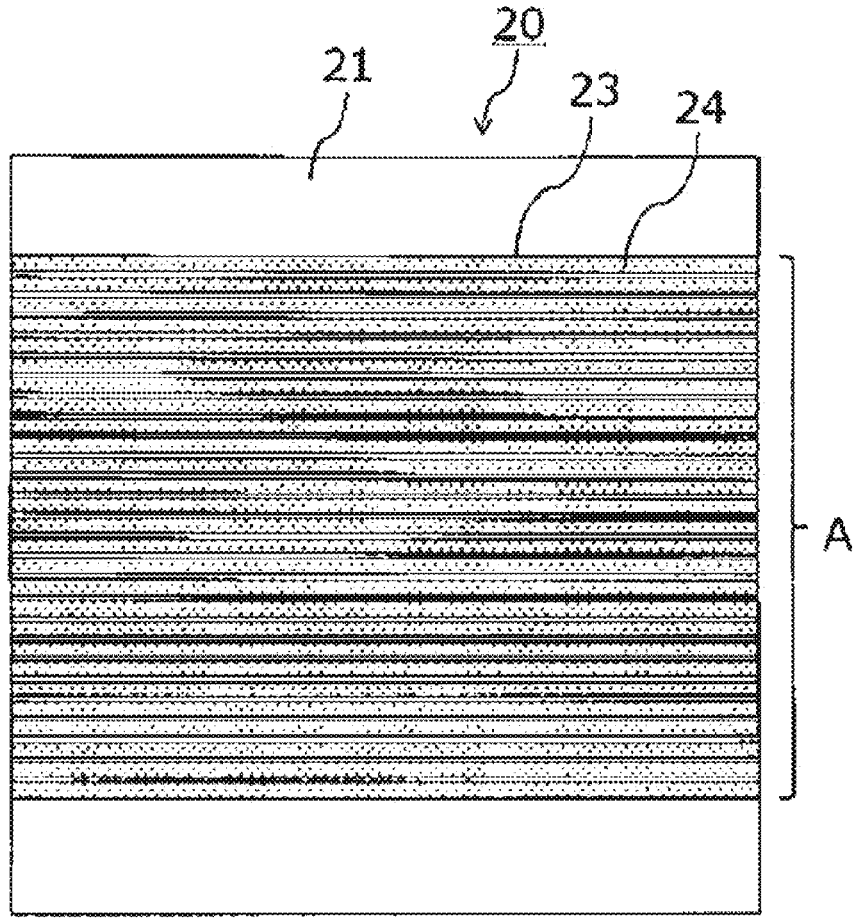
FIG. 2 is a diagram showing one embodiment of a slit portion in the heat ray reflecting substrate according to the present invention.

In the embodiment shown in FIG. 1, the heat ray reflecting film 13 (and the slit portion 14) is formed on the entire one main surface of a dielectric substrate 21, but may be formed only on a part thereof. For example, FIG. 2 shows a top view of a heat ray reflecting substrate 20 according to an embodiment in which a heat ray reflecting film 23 and a slit portion 24 are provided on a part of one main surface of the dielectric substrate 21, and the dielectric substrate 21 is exposed over a wide range in other portions.

<Radio Wave Transmitting Region>

The radio wave transmitting region in the present embodiment refers to a region having radio wave transmissibility due to a predetermined pattern formed by the slit portion. The radio wave transmitting region in the present embodiment is formed on at least a part of the at least one main surface of the dielectric substrate in a plan view, and includes a slit portion where no heat ray reflecting film is present.

In the example in FIG. 1, a substantially parallel line pattern formed by the slit portion 14 is formed on the entire main surface provided with the heat ray reflecting film. Therefore, in the example in FIG. 1, the entire main surface provided with the heat ray reflecting film 13 is the radio wave transmitting region A in a plan view. On the other hand, as shown in FIG. 2, a part of the main surface on which the heat ray reflecting film 13 is formed may be the radio wave transmitting region A.

(Slit Portion)

The slit portion is a portion where at least the heat ray reflecting film changes discontinuously in a plan view of the heat ray reflecting substrate, and is partitioned by the heat ray reflecting film. The slit portion may have, for example, a form in which in the case where the heat ray reflecting substrate includes a heat ray reflecting film and other layers, the heat ray reflecting film and all other layers are removed and a portion where the dielectric substrate is the outermost surface is present. That is, the slit portion may have, for example, a form in which the dielectric substrate is exposed. Note that, when there is no conduction between the heat ray reflecting films for partitioning the slit portion, some or almost all of the components in the heat ray reflecting film may remain.

As long as the effect of the present invention is exerted, the form of the slit portion is not limited to a form having a portion where the dielectric substrate is the outermost surface. For example, the slit portion may have a form in which the heat ray reflecting film is not included, and at least one layer other than the heat ray reflecting film (other layer) is included. That is, the slit portion may have a form in which the heat ray reflecting film is not present and only a layer other than the heat ray reflecting film (for example, a film having an electrical resistivity of more than 100 [$\Omega \cdot$cm]) is laminated on the dielectric substrate. For example, the slit portion may have a form in which a heat ray reflecting film is not present and a metal oxide layer or a metal nitride layer such as those exemplified in the above description of the other layers is laminated on the dielectric substrate.

The inventors of the present invention have found that when, in the radio wave transmitting region, a solar heat gain coefficient ($g_0$) in a region including no slit portion and a solar heat gain coefficient ($g_1$) in a region including a slit portion satisfy the following formula (a), it is possible to obtain a heat ray reflecting substrate having both radio wave transmissibility and heat ray reflectance (heat shielding performance).

$$g_1 < (1 - f_2) \cdot g_0 + f_2 \alpha \qquad \text{(a)}$$

Here, in the formula (a), $f_2$ is a designed aperture rate, and $\alpha$ is a solar heat gain coefficient of the dielectric substrate, that is, a solar heat gain coefficient of a dielectric substrate before the heat ray reflecting film is provided.

The right side of the formula (a) represents the theoretical value of $g_1$. Generally, when the slit portion is formed to improve the radio wave transmissibility, the area proportion of the heat ray reflecting film is reduced, which tends to increase the solar heat gain coefficient and decrease the heat shielding performance. However, even with the formation of the slit portion, the heat ray reflecting substrate according to the present embodiment achieves a solar heat gain coefficient that is lower than what would originally be achieved.

Here, the solar heat gain coefficient $\alpha$ of the dielectric substrate is calculated by measuring the spectral spectrum and the emissivity based on the standard in ISO 9050 (2003) and performing optical calculation.

The solar heat gain coefficient $g_0$ is calculated by measuring the spectral spectrum and the emissivity of a radio wave transmitting region including no slit portion, which is a measurement region, based on the standard in ISO 9050 (2003) and performing optical calculation.

In addition, the solar heat gain coefficient $g_1$ is calculated by measuring the spectral spectrum and the emissivity of a radio wave transmitting region including a slit portion having an aperture rate within ±10% of the designed aperture rate $f_2$, which is a measurement region, based on the standard in ISO 9050 (2003) and performing optical calculation. The measurement region in measuring $g_1$ may be, for example, a square region with one side having a length of 10 times or more the maximum slit interval.

Note that, the size of the measurement region in measuring $g_0$ is not particularly limited as long as a slit portion is not included.

In measuring $g_1$, the "designed aperture rate $f_2$" means the area proportion (%) of the designed slit portion calculated based on the slit width, the slit interval, the slit pattern, or the like, per total area of the main surface on which the heat ray reflecting film is provided in the heat ray reflecting substrate.

Note that, the area proportion $f_1$ (%) of the slit portion in the radio wave transmitting region is calculated by measurement using an optical microscope or the like. That is, in measuring the solar heat gain coefficient $g_1$, the position of the measurement region is adjusted such that a deviation between the area proportion $f_1$ of the slit portion in the measurement region and the designed aperture rate $f_2$ is within 10%, using an optical microscope or the like.

Note that, in measuring the solar heat gain coefficients $g_1$ and $g_0$, it is necessary to take into account the influence of light scattering in the slit portion. In addition, in the present embodiment, in order to prevent the influence of light scattering, in the optical measurement for calculating the solar heat gain coefficients $g_1$ and $g_0$, a linear transmittance is measured without contacting the measurement substrate with an integrating sphere of a light receiving portion.

In the radio wave transmitting region according to the present embodiment, when $g_1 = \beta((1 - f_2) \cdot g_0 + f_2 \alpha)$, it is preferable that $\beta < 0.995$. When $\beta < 0.995$, a more excellent heat shielding property is exhibited. It is more preferable that $\beta < 0.985$, and it is still more preferable that $\beta < 0.980$.

A heat ray reflecting substrate satisfying the above formula (a) is obtained by forming a slit portion in such a way that when light is incident from the surface on which the heat ray reflecting film is provided to the opposite surface, optical scattering occurs in the slit portion.

Figure 3:
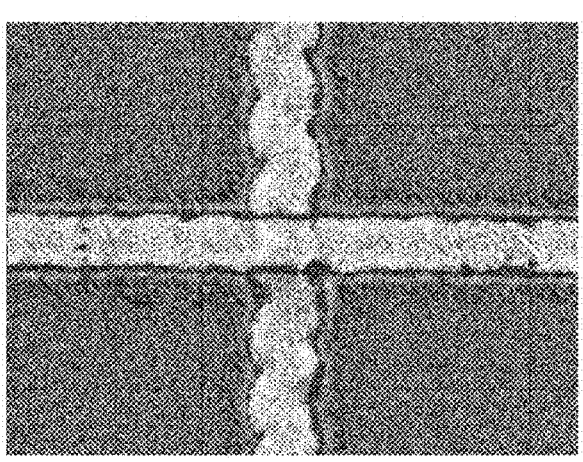
FIG. 3 is a diagram showing the slit portion in the embodiment of the present invention.

More specifically, the heat ray reflecting substrate satisfying the formula (a) is obtained by making adjustment to make a film residue, which is a remaining heat ray reflecting film, remains in the formation of the slit portion. Specifically, the film residue in the slit portion is found on a side wall of the slit portion as shown in FIG. 3. When the film residue remains in the formation of the slit portion, once light is incident from the surface on which the heat ray reflecting film is provided to the opposite surface, optical scattering occurs on the side wall of the slit portion. Accordingly, the light that would normally be incident is scattered on the surface on which the heat ray reflecting film is provided, and therefore a decrease in heat shielding performance can be prevented. As a result, both the radio wave transmissibility and the heat shielding performance can be achieved.

In a method for producing a heat ray reflecting substrate according to the present embodiment, the slit portion is formed by removing the heat ray reflecting film using a nanosecond laser. The nanosecond laser is a low-cost and highly industrially applicable device. In addition, compared with a femtosecond laser having an extremely short pulse width, the nanosecond laser outputs laser light for a longer period of time, and therefore has a greater thermal influence on the heat ray reflecting film. Therefore, by etching using a nanosecond laser, the slit portion can be formed in the heat ray reflecting film while leaving a film residue and causing appropriate deformation due to heat, and a heat ray reflecting substrate having both the radio wave transmissibility and the heat shielding performance can be obtained.

However, the slit portion in the present embodiment may be formed by any other method as long as it is possible to remove the heat ray reflecting film and impart, in the slit portion, optical scattering to the light incident on the surface on which the heat ray reflecting film is provided.

In the etching using the nanosecond laser, processing conditions of the laser light (for example, a focus or a scan speed) can be set appropriately taking into consideration the balance between the amount of the film residue and the insulation property, the transparency, the heat shielding property, or the like of the laser-processed region.

In the related art, the laser light has generally been adjusted to a position where the slit width is smallest, that is, to be in just focus, on the surface of an etching target. Here, in the case where the etching is performed with the focus position positioned above the surface of the etching target after checking the position where the slit width is smallest, there is a tendency for more film residue to remain in the slit portion and for the heat ray reflecting substrate to appear slightly cloudy than a case where the etching is performed with the focus adjusted to the just focus. In addition, a similar tendency is observed in the case where the focus is shifted from the position where the slit width is smallest to the inside of the etching target.

Until now, it is thought that the necessary insulation property cannot be ensured in the slit portion when such a film residue is present, so that just focus processing is generally used for forming the FSS. The inventors of the present invention have finely adjusted the focus of the laser light at a pitch of 5 μm and found that, even under conditions where the film residue is present, which is previously thought to be insufficient to ensure the insulation property, there is a condition providing a sufficient insulation property for the FSS.

That is, the amount of the film residue in the slit portion can be adjusted by shifting the focus condition of the laser light forward or backward from the just focus. When the amount of the film residue is too small, the heat shielding performance decreases. On the other hand, when the amount of the film residue exceeds a certain amount, the insulation property required for the FSS cannot be obtained and the FSS no longer functions. Therefore, by appropriately adjusting the focus conditions, the heat ray reflecting substrate according to the present embodiment can be obtained.

The form of the slit portion, that is, the slit pattern, may be, for example, a straight line, a grid-like shape, a curved line, a zigzag line, a concentric circle line, a spiral line, or a random line. From the viewpoint of workability in formation, the slit pattern is preferably a line, and more preferably a straight line. Particularly, in the case of forming the slit portion by laser etching, the substrate is transported in a first direction while irradiating the heat ray reflecting film with a fixed laser, and thereby a straight slit portion extending in the first direction can be easily formed. For example, thereafter, the substrate is transported in a second direction different from the first direction while irradiating the heat ray reflecting film with a fixed laser, and thereby straight slit portions extending in the first direction and the second direction can also be easily formed.

In view of the ease of production as described above, the form of the slit portion in the present embodiment is preferably a straight line extending in the first direction, or a combination of a straight line extending in the first direction and a straight line extending in the second direction. Specifically, the slit portion is preferably in the form of a plurality of parallel lines or a grid-like shape, and preferably has a periodicity in a width direction in the form of parallel lines or a grid-like shape, with a heat ray reflecting film having a predetermined width and a slit portion having a predetermined width alternately disposed, since it is possible to block radio waves in a specific frequency band or to improve the radio wave transmissibility at a target frequency.

For example, in a plan view of the heat ray reflecting substrate, when the slit portion is in the form of a straight line or a grid-like shape extending in one direction having a predetermined width, and a plurality of slit portions are disposed parallel to the width direction to form a radio wave transmitting region, the radio wave transmissibility for linearly polarized waves perpendicular to an extension direction is improved.

As described above, since a specific frequency depends on a pattern made of the heat ray reflecting film, the slit width, the slit interval (the width between slits), and the slit pattern can be set appropriately according to the properties of radio waves to be transmitted.

For example, when the frequency of the radio wave to be transmitted is 0.1 GHz to 6 GHz, it is preferable that the slit portion satisfy the following conditions.

Slit pattern: grid-like shape
Slit interval: 0.2 mm to 14 mm
Slit width: 20 μm to 100 μm Further, when the frequency of the radio wave to be transmitted is 0.1 GHz to 40 GHz, it is preferable that the slit portion satisfy the following conditions.

Slit pattern: grid-like shape
Slit interval: 0.2 mm to 2.4 mm
Slit width: 20 μm to 100 μm Note that, the slit interval of the slit portions formed in the heat ray reflecting film may be constant over the entire heat ray reflecting film, or may vary.

In addition, the inventors of the present invention have found that in the case where, in the radio wave transmitting region, a luminous transmittance $(Tv_0)$ in a region including no slit portion and a luminous transmittance $(Tv_1)$ in a region including a slit portion satisfy a relational expression of $Tv_1 < Tv_0$, a heat ray reflecting substrate having a particularly excellent heat shielding performance can be obtained. That is, in the present embodiment, the radio wave transmitting region preferably satisfies the above relational expression.

In a heat ray reflecting substrate in the related art, since the heat ray reflecting film is removed in the slit portion, the luminous transmittance increases, and $Tv_1 > Tv_0$ is satisfied. In contrast, in the present embodiment, the luminous transmittance is more likely to decrease in the region including a slit portion than in the region including no slit portion. The reason is thought to be that when the film residue is present in the slit portion, the light that would normally be incident from the side on which the heat ray reflecting film is provided to the opposite side is likely to be scattered by the side wall of the slit portion. When the film residue is present in the slit portion, a heat ray reflecting film having both excellent heat ray reflection performance and radio wave transmissibility can be obtained.

The luminous transmittances $Tv_0$ and $Tv_1$ are calculated by multiplying the transmittance (reflectance) at each wavelength by a coefficient equivalent to luminous sensitivity based on JIS R 3106 (1998).

More specifically, the luminous transmittance $Tv_0$ is measured by the above method using a radio wave transmitting region including no slit portion as a measurement region. Here, the size of the measurement region in measuring $Tv_0$ is not particularly limited as long as a slit portion is not included.

The luminous transmittance $Tv_1$ is similarly measured by the above method by using a radio wave transmitting region as a measurement region and adjusting the measurement region to include a slit portion having an aperture rate within ±10% of the designed aperture rate $f_2$. The measurement region is, for example, preferably a square region with one side having a length of 10 times or more the maximum slit interval. In measuring $Tv_1$, the area proportion $f_1$ of the slit portion in the measurement region can be measured using an optical microscope or the like. Here, the "designed aperture rate $f_2$" is as described above.

In the radio wave transmitting region, the above $Tv_0$ is preferably 50% or more, more preferably 60% or more, and still more preferably 70% or more. When $Tv_0$ is 50% or more, a heat ray reflecting substrate having excellent transparency can be obtained. In addition, $Tv_0$ is preferably 90% or less from the viewpoint of achieving both transparency and heat ray reflection properties. $Tv_0$ is preferably 50% to 90%, for example.

In the radio wave transmitting region, the above $Tv_1$ is preferably 50% or more, more preferably 60% or more, and still more preferably 70% or more. When $Tv_1$ is 50% or more, a heat ray reflecting substrate having excellent transparency can be obtained. In addition, $Tv_1$ is preferably 90% or less from the viewpoint of achieving both transparency and heat ray reflection properties. $Tv_1$ is preferably 50% to 90%, for example.

In the heat ray reflecting substrate according to the present embodiment, in the radio wave transmitting region, [haze in the region including a slit portion] is preferably twice or more [haze in the region including no slit portion].

When, in the heat ray reflecting substrate according to the present embodiment, the [haze in the region including a slit portion] is twice or more the [haze in the region including no slit portion] in the radio wave transmitting region, an excellent heat shielding performance is exhibited. This is because, in the region including a slit portion, when light is incident from the surface on which the heat ray reflecting film is provided to the opposite surface, light scattering occurs in the slit portion, increasing the haze and as a result, improving the heat shielding property.

In the present embodiment, in the radio wave transmitting region, the [haze in the region including a slit portion] is more preferably 3 times or more, and still more preferably 4 times or more the [haze in the region including no slit portion]. In addition, in order to ensure the aesthetic appearance of the heat ray reflecting substrate, the [haze in the region including a slit portion] is preferably 8 times or less, more preferably 7.5 times or less, and still more preferably 7 times or less the [haze in the region including no slit portion]. The [haze in the region including a slit portion] is preferably 3 to 8 times the [haze in the region including no slit portion].

The haze is measured using a haze meter in accordance with JIS K 7136 (2000).

More specifically, the [haze in the region including no slit portion] is measured by the above method using a radio wave transmitting region including no slit portion as a measurement region. Here, the size of the measurement region in measuring the [haze in the region including no slit portion] is not particularly limited as long as a slit portion is not included.

In addition, the [haze in the region including a slit portion] is similarly measured by the above method by using a radio wave transmitting region as a measurement region and adjusting the measurement region to include a slit portion having an aperture rate within ±10% of the designed aperture rate $f_2$. The measurement region is, for example, preferably a square region with one side having a length of 10 times or more the maximum slit interval. At this time, the area proportion $f_1$ of the slit portion in the measurement region can be measured using an optical microscope or the like. Here, the "designed aperture rate $f_2$" is as described above.

<Properties>

The heat ray reflecting substrate according to the present embodiment preferably has the following properties.

The radio wave transmitting region according to the present embodiment preferably has a large transmission amount of a radio wave having a target frequency, and more specifically, preferably transmits the radio wave having a target frequency by −20 dB or more. In the case of transmitting the radio wave having a target frequency by −20 dB or more, excellent radio wave transmissibility is exhibited. The radio wave transmitting region transmits the radio wave having a target frequency more preferably by −15 dB or more, and still more preferably by −10 dB or more. The transmission amount or the transmittance can be measured, for example, using a free space method.

The target frequency is preferably 700 MHz to 100 GHz, and more preferably radio waves in the frequency band of 1 GHz to 40 GHz including a Sub 6 band (3.6 GHz to 6 GHz), a quasi-millimeter wave band (24 GHz to 30 GHz), and a millimeter wave band (30 GHz to 300 GHz).

Note that, it is sufficient that the heat ray reflecting substrate according to the present embodiment transmits the radio wave at any frequency of the above target frequencies by −20 dB or more.

The heat ray reflecting substrate according to the present embodiment has, for example, a radio wave transmission loss of preferably 3 dB or less, more preferably 2 dB or less, and still more preferably 1 dB or less, for a radio wave having a frequency of 28 GHz in the radio wave transmitting region. Similarly, the heat ray reflecting substrate also has a radio wave transmission loss of preferably 3 dB or less, more preferably 2 dB or less, and still more preferably 1 dB or less, for a radio wave having a frequency of 79 GHz.

Note that, the radio wave transmission loss for the radio wave having a frequency of 28 GHz (79 GHz) in the radio wave transmitting region is a value obtained by subtracting a radio wave transmission loss for the radio wave having a frequency of 28 GHz (79 GHz) in the dielectric substrate from a radio wave transmission loss for the radio wave having a frequency of 28 GHz (79 GHz) of the entire heat ray reflecting substrate in the radio wave transmitting region. The radio wave transmission loss is a value measured, for example, using a free space method.

Accordingly, although the radio wave transmission losses for the radio waves having frequencies of 28 GHz and 79 GHz have been described as an example, it is preferable that the radio wave transmission loss similar to that described above can be obtained not only in the 28 GHz and 79 GHz bands but also in frequency bands of several hundred MHz to 100 GHz.

<Application>

The heat ray reflecting substrate according to the present embodiment is suitable for use in applications requiring the heat ray reflectance and the radio wave transmissibility. Examples of such applications include a window glass for architectural applications, a window glass for automobile applications (a windshield, a rear glass, or a side glass), or a window glass for railway vehicle applications.

EXAMPLES

Hereinafter, the present invention will be specifically described with reference to Examples, but the present invention is not limited thereto. Note that, Example 1 to Example 4 are Inventive Examples, and Example 5 is Comparative Example.

[Production of Heat Ray Reflecting Substrate]

Example 1

A multilayer film including a conductive layer containing Ag and a metal oxide layer containing zinc oxide was formed as a laminate including a heat ray reflecting film on a soda lime glass (solar heat gain coefficient $\alpha$: 0.880) having a thickness of 2 mm by a sputtering method such that the luminous transmittance $Tv_0$ was 87.10% and the solar heat gain coefficient $g_0$ was 0.640. The heat ray reflecting film configuration in Example 1 is shown as "1Ag" in the table below.

Next, a grid-like shaped slit portion was formed over the entire heat ray reflecting film (100 mm×100 mm) by using a nanosecond laser (Laser marker MD-X1520, manufactured by Keyence Corporation) such that the slit width was 40 μm and the slit interval was 0.5 mm, thereby obtaining a heat ray reflecting substrate. Note that, the focus condition for the laser etching was a position shifted about 25 μm upward from a just focus position on the surface of the heat ray reflecting substrate (Condition 1), provided that the just focus position is the position at which a slit width is the smallest. In addition, the designed aperture rate $f_2$ is as shown in the table.

Example 2

A heat ray reflecting substrate was prepared in the same manner as in Example 1, except that the slit interval in the slit portion was set as shown in Table 1. The designed aperture rate $f_2$ is as shown in the table.

Example 3

A heat ray reflecting substrate was prepared in the same manner as in Example 1, except that the amount of Ag in the formation of the heat ray reflecting film was doubled and the luminous transmittance $Tv_0$ and the solar heat gain coefficient $g_0$ were the values shown in Table 1. Note that, the heat ray reflecting film configuration in Example 3 is shown as "2Ag" in the table below.

Example 4

A heat ray reflecting substrate was prepared in the same manner as in Example 3, except that the slit interval in the slit portion was set as shown in Table 1.

Example 5

A heat ray reflecting substrate was prepared in the same manner as in Example 3, except that the heat ray reflecting film was formed such that the luminous transmittance $Tv_0$ was the value shown in Table 1 and the laser etching was performed using a picosecond laser (GR50 manufactured by Spectra-Physics) under the following focus condition.

Focus condition: at the just focus position (Condition 2).

[Solar Heat Gain Coefficient]

For the heat ray reflecting substrate in each example, the surface on which the radio wave transmitting region was provided was used as a measurement surface, and the solar heat gain coefficient was calculated by measuring the spectral spectrum and the emissivity of a 10 mm×10 mm radio wave transmitting region including no slit portion using a spectrophotometer (model number U-4100, manufactured by Hitachi High-Tech Corporation), based on the standard in ISO 9050 (2003), and performing optical calculation. In Table 1, it is shown as "$g_0$".

In addition, for a 10 mm×10 mm radio wave transmitting region including a slit portion in a part thereof, the solar heat gain coefficient was determined in the same manner as above. The value obtained is shown as "$g_1$" in Table 1. Note that, in measuring $g_1$, the area proportion $f_1$ of the slit portion in the above region was measured using an optical microscope, and adjustment was made for the measurement such that the area proportion $f_1$ of the slit portion in the above region was within ±10% of the designed aperture rate $f_2$.

[Luminous Transmittance]

For the heat ray reflecting substrate in each example, the luminous transmittance was calculated in a 10 mm×10 mm radio wave transmitting region including no slit portion by multiplying the transmittance (reflectance) at each wavelength by a coefficient equivalent to luminous sensitivity based on JIS R 3106 (1998). The value obtained is shown as "$Tv_0$" in Table 1.

For a 10 mm×10 mm radio wave transmitting region including a slit portion, the luminous transmittance was determined in the same manner as above. The value obtained is shown as "$Tv_1$" in Table 1. Note that, in measuring $Tv_1$, the area proportion $f_1$ of the slit portion in the above region was measured using an optical microscope, and adjustment was made for the measurement such that the area proportion $f_1$ of the slit portion in the above region was within ±10% of the designed aperture rate $f_2$.

[Haze Value]

For the heat ray reflecting substrate in each example, the haze was measured in a 10 mm×10 mm radio wave transmitting region including no slit portion using a haze meter (HZ-2 manufactured by Suga Test Instruments Co., Ltd.) in accordance with JIS K 7136 (2000). The value obtained is shown as "Haze (no slit)" in Table 1.

For a 10 mm×10 mm radio wave transmitting region including a slit portion, the haze value was measured in the same manner as above. The value obtained is shown as "Haze (with slit)" in Table 1. Note that, in measuring the "Haze (with slit)", the area proportion $f_1$ of the slit portion in the above region was measured using an optical microscope, and adjustment was made for the measurement such that the area proportion $f_1$ of the slit portion in the above region was within ±10% of the designed aperture rate $f_2$. Note that, in the table, "~" means approximately and is within ±25% of the subsequent numerical value.

[Radio Wave Transmission Property at 28 GHz]

For the heat ray reflecting substrate in each example, the transmission amount (S12) at 28 GHz was evaluated in 100 mm×100 mm radio wave transmitting region including no slit portion by using the free space method. The value obtained is shown as "S12 dB at 28 GHz (no slit)" in Table 1.

For a 100 mm×100 mm radio wave transmitting region including a slit portion, the transmission amount at 28 GHz was measured in the same manner as above. The value obtained is shown as "S12 dB at 28 GHz (with slit)" in Table 1. Note that, the area proportion $f_1$ of the slit portion in the above region was measured using an optical microscope, and adjustment was made for the measurement such that the area proportion $f_1$ of the slit portion in the above region was within ±10% of the designed aperture rate $f_2$.

TABLE 1

|  | Example 1 | Example 2 | Example 3 | Example 4 | Example 5 |
|---|---|---|---|---|---|
| Heat ray reflecting film configuration | 1Ag | 1Ag | 2Ag | 2Ag | 2Ag |
| Laser device | Nanosecond | Nanosecond | Nanosecond | Nanosecond | Picosecond |
| Focus condition | Condition 1 | Condition 1 | Condition 1 | Condition 1 | Condition 2 |
| Slit width | 40 μm | 40 μm | 40 μm | 40 μm | 40 μm |
| Slit interval | 0.5 mm | 1 mm | 0.5 mm | 1 mm | 0.5 mm |
| Pattern | Grid-like shape | Grid-like shape | Grid-like shape | Grid-like shape | Grid-like shape |
| $Tv_0$ [%] | 87.1 | 87.1 | 79.0 | 79.0 | 77.0 |
| $Tv_1$ [%] | 86.0 | 85.4 | 78.2 | 78.8 | 77.5 |
| $g_0$ | 0.640 | 0.640 | 0.463 | 0.463 | 0.463 |
| $g_1$ | 0.670 | 0.650 | 0.509 | 0.492 | 0.525 |
| $f_2$ | 0.143 | 0.078 | 0.143 | 0.078 | 0.143 |
| $(1 - f_2)g_0 + f_2a$ | 0.674 | 0.659 | 0.522 | 0.495 | 0.522 |
| $\beta$ | 0.994 | 0.986 | 0.975 | 0.993 | 1.006 |
| Haze (no slit) | <0.5% | <0.5% | <0.5% | <0.5% | <0.5% |
| Haze (with slit) | ~2% | ~2% | ~2% | ~2% | ~1% |
| S12 dB at 28 GHz (with slit) | >−10 dB | >−10 dB | >−10 dB | >−10 dB | >−10 dB |
| S12 dB at 28 GHz (no slit) | ~−30 dB | ~−30 dB | ~−30 dB | ~−30 dB | ~−30 dB |

As seen from the result in Table 1, the heat ray reflecting substrates in Example 1 to Example 4 as Inventive Examples satisfy $g_1 < (1-f_2) \cdot g_0 + f_2\alpha$, and exhibit an excellent heat shielding performance and radio wave transmissibility. On the other hand, Example 5 as Comparative Example satisfies $g_1 > (1-f_2) \cdot g_0 + f_2\alpha$, which has a heat shielding performance inferior to that of Example 1 to Example 4 as Inventive Examples.

Although various embodiments have been described above with reference to the drawings, it is needless to say that the present invention is not limited to such examples. It is obvious for a person skilled in the art that various modifications and variations can be made within the category described in the scope of claims and it is understood that such modifications and variations naturally belong to the technical scope of the present invention. Further, the components described in the above embodiment may be combined in any manner without departing from the gist of the invention.

Note that, the present application is based on a Japanese Patent Application (No. 2022-112708) filed on Jul. 13, 2022, contents of which are incorporated herein by reference.

REFERENCE SIGNS LIST

10, 20 heat ray reflecting substrate
11, 21 dielectric substrate
13, 23 heat ray reflecting film
14, 24 slit portion
A radio wave transmitting region

The invention claimed is:
1. A heat ray reflecting substrate comprising:
a dielectric substrate; and
a heat ray reflecting film formed on at least one main surface of the dielectric substrate, wherein
the heat-ray reflecting substrate has a radio wave transmitting region in at least a part of the at least one main surface of the dielectric substrate in a plan view,
the radio wave transmitting region includes a slit portion where the heat ray reflecting film is not present, and
in the radio wave transmitting region, a solar heat gain coefficient ($g_0$) in a region including no slit portion and a solar heat gain coefficient ($g_1$) in a region including the slit portion satisfy the following formula (a):

$$g_1 < (1 - f_2) \cdot g_0 + f_2\alpha \qquad \text{(a)}$$

provided that $f_2$ is a designed aperture rate, and $\alpha$ is a solar heat gain coefficient of the dielectric substrate.
2. The heat ray reflecting substrate according to claim 1, wherein
in the radio wave transmitting region, a luminous transmittance ($Tv_0$) in a region including no slit portion and a luminous transmittance ($Tv_1$) in a region including the slit portion satisfy a relational expression of $Tv_1 < Tv_0$.
3. The heat ray reflecting substrate according to claim 1, wherein
the radio wave transmitting region transmits a radio wave having a target frequency with a transmission of −20 dB or more.
4. The heat ray reflecting substrate according to claim 3, wherein
the target frequency is 700 MHz to 100 GHz.
5. The heat ray reflecting substrate according to claim 1, wherein
in the radio wave transmitting region, a relational expression of $\beta < 0.995$ is satisfied when $g_1 = \beta((1-f_2) \cdot g_0 + f\alpha)$.
6. The heat ray reflecting substrate according to claim 1, wherein
the solar heat gain coefficient ($g_0$) in the region including no slit portion is 0.7 or less.
7. The heat ray reflecting substrate according to claim 1, wherein
in the radio wave transmitting region, [a haze in a region including the slit portion] is twice or more [a haze in a region including no slit portion].
8. The heat ray reflecting substrate according to claim 1, wherein
when the radio wave transmitting region includes the slit portion having a grid-like slit pattern, a slit width is 20 μm to 100 μm, and a slit interval is 0.2 mm to 14 mm.
9. A window glass comprising the heat ray reflecting substrate according to claim 1.
10. A method for producing the heat ray reflecting substrate according to claim 1, the method comprising:
forming the slit portion using a nanosecond laser.

*    *    *    *    *